(12) United States Patent
Thampi et al.

(10) Patent No.: US 8,160,528 B2
(45) Date of Patent: Apr. 17, 2012

(54) METHOD AND DEVICE FOR DETECTING PRESENCE OF A CARRIER SIGNAL IN A RECEIVED SIGNAL

(75) Inventors: Geetha K. Thampi, Sunrise, FL (US); Apoorv Chaudhri, Cambridge, MA (US); Jesus F. Corretjer, Weston, FL (US); Yadunandana N. Rao, Sunrise, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 714 days.

(21) Appl. No.: 12/257,672

(22) Filed: Oct. 24, 2008

(65) Prior Publication Data

US 2010/0105345 A1    Apr. 29, 2010

(51) Int. Cl.
*H04B 1/16* (2006.01)
(52) U.S. Cl. ........................................................ 455/229
(58) Field of Classification Search ........................ None
See application file for complete search history.

(56) References Cited

U.S. PATENT DOCUMENTS

| | | | |
|---|---|---|---|
| 5,263,050 A | 11/1993 | Sutterlin | |
| 5,563,914 A | 10/1996 | Sogabe | |
| 5,960,030 A * | 9/1999 | Maruyama | 375/150 |
| 7,215,935 B2 * | 5/2007 | Rao et al. | 455/161.1 |
| 7,706,765 B2 * | 4/2010 | Collins et al. | 455/229 |
| 2005/0220230 A1 * | 10/2005 | Fukuda | 375/343 |
| 2009/0197550 A1 * | 8/2009 | Huttunen et al. | 455/161.1 |
| 2009/0285137 A1 * | 11/2009 | Fujita et al. | 370/310 |

OTHER PUBLICATIONS

PCT International Search Report Dated May 11, 2010.

* cited by examiner

*Primary Examiner* — Lincoln Donovan
*Assistant Examiner* — Khareem E Almo

(57) ABSTRACT

A device receives a signal and, prior to demodulating the signal determines whether carrier is present in the received signal based on the correlation depth of the received signal. The device determines a plurality of values for the received signal that indicate the amount of correlation in the received signal and detects the presence of the carrier in the received signal as a function of the plurality of values. The plurality of values can include autocorrelation values and prediction coefficients, wherein the autocorrelation values are estimated based on an autocorrelation function derived for the received signal, and the prediction coefficients are generated using a prediction model that is derived as a function of the autocorrelation values. The prediction coefficients can be summed to generate a decision statistic that is compared to a detection threshold to detect the presence of the carrier.

19 Claims, 3 Drawing Sheets

METHOD AND DEVICE FOR DETECTING PRESENCE OF A CARRIER SIGNAL IN A RECEIVED SIGNAL

FIELD OF THE DISCLOSURE

The present disclosure relates generally to wireless communications and more particularly to a method and apparatus for detecting presence of a carrier in a signal received at a device.

BACKGROUND

A two way radio is a communication device which is capable of both transmitting and receiving information from other communication devices. A mobile phone or a cellular telephone is an example of a two-way radio that both transmits and receives information at the same time i.e. full-duplex communication. Conventionally, a two way radio, hereafter radio, operates on fixed Radio Frequency (RF) channels, which are the physical resources over which information or content is sent between communication devices. Generally, in both analog and digital wireless communications a carrier signal of suitable frequency is modulated by a baseband signal which represents information/content to generate a modulated signal. The modulated signal is transmitted to the radio on an appropriate RF channel.

Generally, a radio receiver scans a plurality of channels to detect the presence of a signal at the carrier frequency, hereafter carrier. In both analog and digital wireless communication systems, carrier detection is a key for efficient and interference free operation of multiple radios within the communication system.

Accordingly, there is a need for a method and apparatus for detecting presence of a carrier in a signal received by a device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
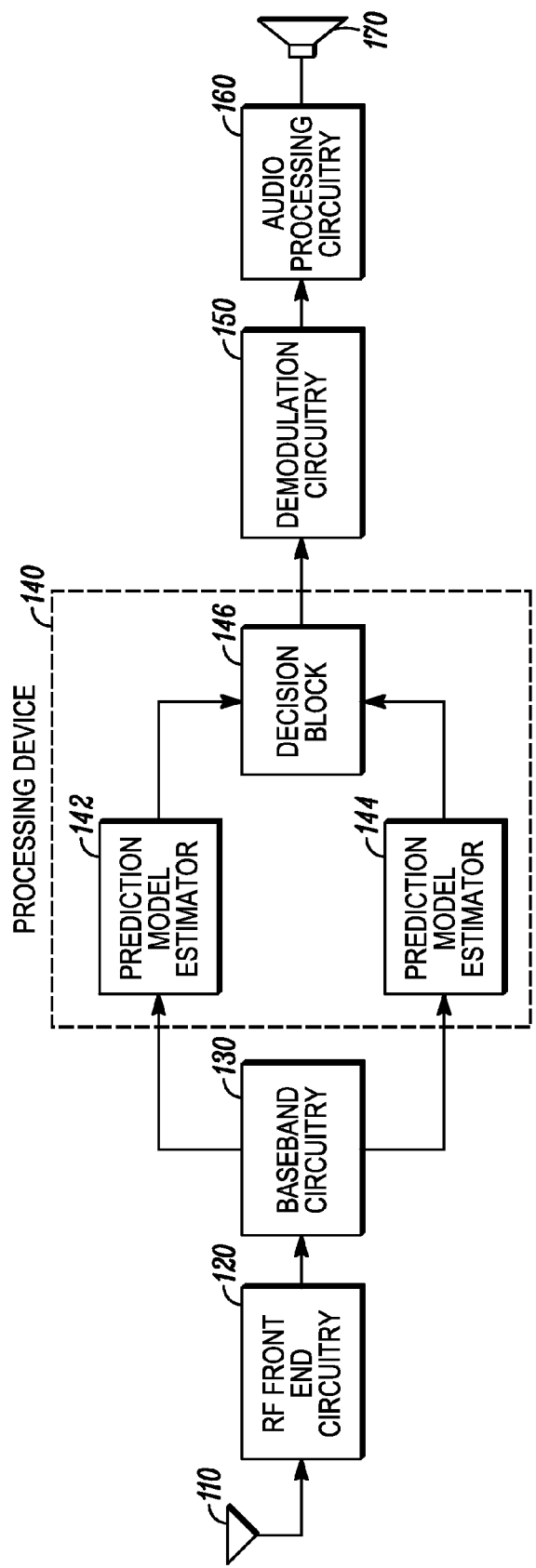
FIG. 1 is a block diagram of a receiver which detects the presence of a carrier in a received signal in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of various embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to various embodiments a device receives a signal and, prior to demodulating the signal, determines whether carrier is present in the received signal based on the correlation depth of the received signal, since a signal with a carrier generally has a high correlation depth; whereas a signal without carrier (such as a noise signal) does not. The device determines a plurality of values for the received signal that indicate the amount of correlation in the received signal and detects the presence of the carrier in the received signal as a function of the plurality of values. The plurality of values can include autocorrelation values and prediction coefficients, wherein the autocorrelation values are estimated based on an autocorrelation function derived for the received signal, and the prediction coefficients are generated using a prediction model that is derived as a function of the autocorrelation values. The prediction coefficients can be summed to generate a decision statistic that is compared to a detection threshold to detect the presence of the carrier.

Referring now to the drawings, and in particular FIG. 1, a block diagram illustrating a receiver which detects the presence of a carrier in a received signal is shown and indicated at 100. The receiver can, for example, be included as part of a transceiver (i.e., receiver and transmitter apparatus) of any communication device including both wireless communication devices and infrastructure devices operating in a wireless communication system.

As used herein, the term wireless communication device includes, but is not limited to, equipment commonly referred as mobile devices, mobile subscriber units, mobile stations, access terminals, two way radios, user equipments, and any other device capable of operating in a wireless environment. As used herein, an infrastructure device is a device that is a part of a fixed network infrastructure and can receive information (either control or media, e.g., data, voice (audio), video, etc.) in a signal from a wireless communication device and transmit information in signals to one or more communication devices via a communication link or channel. An infrastructure device includes, but is not limited to, equipment commonly referred to as repeaters, base radios, base stations, base transceiver stations, access points, routers or any other type of infrastructure equipment interfacing a wireless communication device in a wireless environment.

An infrastructure device and a wireless communication device is each at least equipped with a transceiver, memory and one or more processing devices and is further equipped with any additional components as needed for a commercial embodiment. The transceiver, memory and processing devices can have any suitable physical implementation and are topologically coupled depending on the particular device implementation. These components are further operatively coupled and can be adapted, arranged, configured, and designed to perform methods in accordance with the teachings herein, for example, as illustratively described by reference to FIG. 2 and FIG. 3.

Returning again to FIG. 1, the receiver 100 uses a method to detect the presence of carrier in a received signal in accordance with some embodiments of the invention. Those skilled in the art, however, will recognize and appreciate that the specifics of this example are merely illustrative of some embodiments, and that the teachings set forth herein are applicable in a variety of alternate settings. For example, in accordance with some embodiments, the receiver 100 is included in a frequency modulation (FM) transceiver operating on FM signals. However, the teachings described herein are not limited to FM transceivers. In general, any transceiver configured in accordance with the teachings herein can detect a carrier in a received signal having sufficient correlation depth to distinguish the signal from one having no carrier. Such transceivers include transceivers operating on FM signals, phase modulated signals, simulcast signals, or any other signal modulated by any analog or a random digital waveform.

The receiver 100 comprises an antenna 110 for communicating information with other communication devices. The receiver 100 further comprises RF front end circuitry 120 which processes the RF signals received via the antenna 110. In general, the RF front end circuitry 120 includes circuitry which performs the front end processing of the received signal such as amplification, interference suppression, and the like. For example, in a FM transceiver the RF front end circuitry would include a Low Noise Amplifier (LNA) to amplify the received signal, a mixer, and a low pass filter.

As shown in FIG. 1, the receiver 100 further includes baseband circuitry 130. Typically, the baseband circuitry 130 processes the received signal to generate digitalized samples of the received signal. For example, in a FM transceiver, the baseband circuitry 130 includes an Analog to Digital (A/D) converter (not shown) and a quadrature demodulator (not shown) to generate Inphase (I) and Quadrature (Q) samples from the signal received from the RF front end circuitry 120. Those skilled in the art, however, will recognize and appreciate that the functionality performed by RF front end circuitry 120 and/or baseband circuitry 130 can be performed in one or more alternate processing devices in the receiver 100. For example, in accordance with some embodiments a communication device may comprise a transceiver Integrated Circuit (IC) which performs the functionality of the RF front end circuitry 120 and the base band circuitry 130. In accordance with alternate embodiments, the communication device may comprise the transceiver IC, which performs the functionality of the RF front end circuitry 120, and a separate baseband processor, which performs the functionality of the baseband circuitry 130.

The receiver 100 further comprises a processing device 140, which is configured to perform the steps of a method of detecting the presence of a carrier in the received signal in accordance with embodiments of the invention. As shown in FIG. 1, the processing device 140 comprises prediction model estimators 142, 144 and a decision block 146. The prediction model estimators 142 and 144 are configurable blocks that predict a plurality of values that indicate correlation between a plurality of samples of the received signal. The decision block 146 generates a decision statistic based on the plurality of values and compares the decision statistic to a detection threshold to detect the presence of a carrier. It should be noted that in this illustrative embodiment, one prediction model estimator operates on the I component from the baseband circuitry 130, and the other prediction model estimator operates on the Q component from the baseband circuitry 130. However, in an alternate embodiment, the receiver 100 may include a single complex prediction model estimator that operates on both the I and Q samples to generate corresponding values that indicate an amount of correlation in the baseband signal.

Moreover, the teachings set forth herein are applicable in a variety of additional alternate settings. For example, in accordance with some embodiments, the functionality of the processing device 140 can be performed by a host processor, in the receiver 100. However, in accordance with alternate embodiments, the functionality of the processing device 140 is performed in the transceiver IC, which is beneficial, for example, in a portable communication device to conserve battery life by enabling the communication device to operate in a "battery saver mode". In accordance with this embodiment that includes a battery saver mode, the method for detecting a carrier is implemented on the transceiver IC that also generates the baseband IQ samples that are fed into a host processor for subsequent processing (e.g., by demodulation circuitry 150 and audio processing circuitry 160). Since, the method to detect the carrier is implemented in the transceiver IC, the host processor needs to be awake only when there is carrier or activity on a particular channel or frequency. Therefore, the transceiver IC wakes up the host processor from the battery saver mode only if carrier is detected. Such awakening can be performed by means of an interrupt, a gating mechanism, or any other suitable means.

The receiver 100 further comprises demodulation circuitry 150, the audio processing circuitry 160, and a speaker 170. The demodulation circuitry 150 demodulates the received signal to extract information or content from the baseband signal, when a carrier is detected by the processing device 140. For example, in a FM transceiver the demodulation circuitry comprises a FM discriminator that extracts the information or content from the samples of the I and Q signals. For instance, the extracted content may comprise an audio signal, which is further processed by the audio processing unit 160 to enhance the quality of the audio. The audio processing unit 160 may include one or more audio amplifiers (not shown). The audio output from the audio processing circuitry 160 is played by the speaker 170.

Although not shown in FIG. 1, a wireless communication device that includes the receiver 100 can also include other hardware units such as a user interface including a display, keypad, and microphone for providing the information to the user of the wireless communication device, a memory for storage, antenna switch, duplexer, circulator, or other highly isolative means for intermittently providing information packets from transmitter circuitry included in a transceiver (that also includes receiver 100) to the antenna 110 and from the antenna 110 to the receiver circuitry 100. Alternatively, the wireless communication device that includes the receiver 100 can comprise a collection of appropriately interconnected units or devices, wherein each unit or device performs functions that are equivalent to the functions performed by the elements of the apparatus 100.

Figure 2:
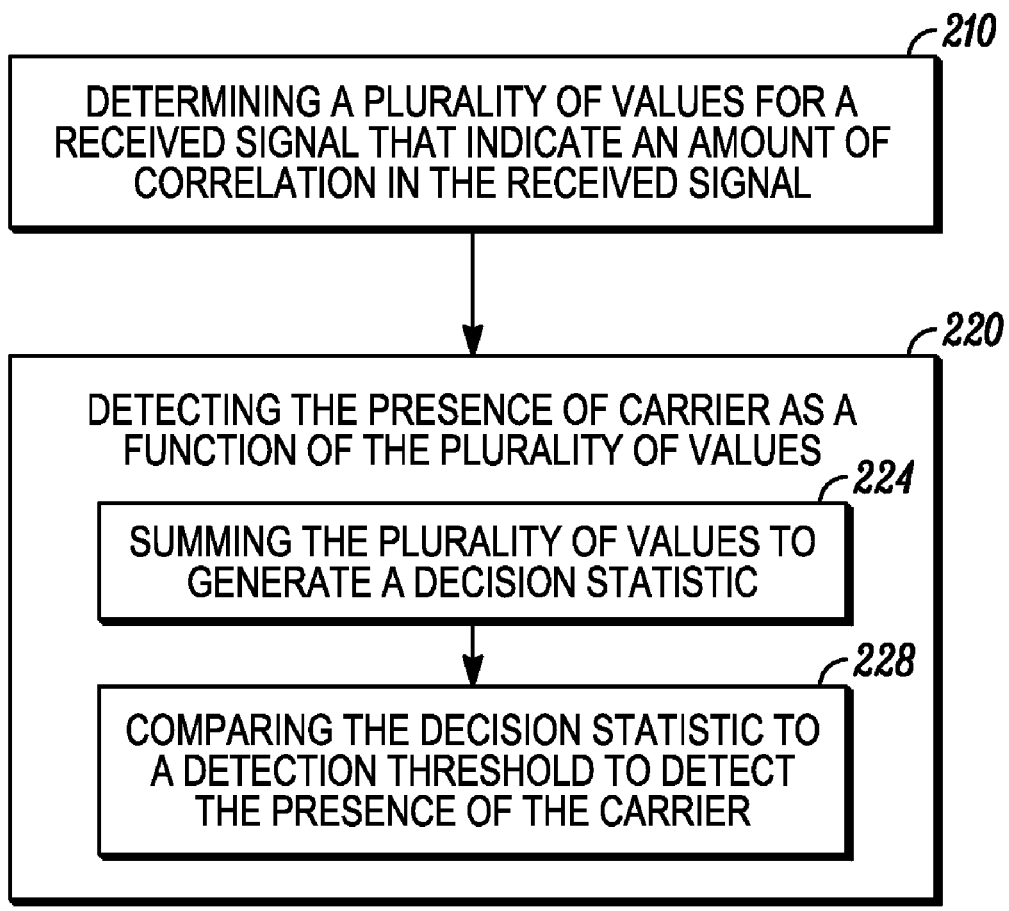
FIG. 2 is a flowchart of a method of detecting the presence of a carrier in a received signal in accordance with an embodiment.

Turning now to FIG. 2, a flow diagram illustrating a method to detect the presence of a carrier in a received signal in accordance with some embodiments is shown and indicated at 200. It should be realized that the method 200 illustrated by reference to FIG. 2 includes functionality that may be performed in hardware, firmware, software or a combination thereof and may further be performed at a single hardware device or a combination of hardware devices. For example, the method 200 can be implemented in the receiver 100. Also, one or more steps of the method illustrated at 200 can be performed at supporting hardware units external to the receiver 100.

In general the method 200 comprises: determining (210) a plurality of values for the received signal that indicate an amount of correlation in the received signal; and detecting (220) the presence of the carrier as a function of the plurality of values. Generally, detecting (220) the presence of the carrier as a function of the plurality of values comprises: summing (224) the plurality of values to generate a decision statistic and comparing (226) the decision statistic to a detection threshold to detect the presence of the carrier.

Illustrative details for implementing the method 200 will next be described. At 210, a communication device determines a plurality of values for a received signal that indicate an amount of correlation (or the correlation depth) in the received signal. For instance, the plurality of values comprises autocorrelation values which are determined using an autocorrelation function. At 220, the communication device detects the presence of carrier as a function of the plurality of values. Generally, a narrowband RF signal (which includes a carrier signal) is predictable, and it has high correlation depth. In contrast, noise (which does not include a carrier signal) is random in nature, and it has a low correlation depth. Thus, the presence of a carrier in a received signal can be detected by determining the degree of correlation between samples of the received signal. As used herein, a narrowband signal typically occupies a smaller bandwidth of the order of 6.25 kHz to 250 kHz in contrast with broadband signals like Wideband Code Division Multiple Access (WCDMA) or WiMAX OFDMA (Orthogonal Frequency-Division Multiple Access) where the signal bandwidth is in the MHz range.

At 224, the communication device sums (e.g., adds) the magnitudes of plurality of values to generate a decision statistic. In one embodiment, the communication device uses a prediction model derived as a function of the autocorrelation values to estimate a plurality of prediction coefficients. For example, the communication device may use a Least Mean Square (LMS) algorithm or a Wiener prediction model to estimate the prediction coefficients. The communication device then adds the magnitudes of plurality of prediction coefficients to generate a decision statistic. At 228, the communication device compares the decision statistic to a detection threshold to detect the presence of the carrier. The communication device detects a carrier in the received signal if the decision statistic exceeds the detection threshold.

Figure 3:
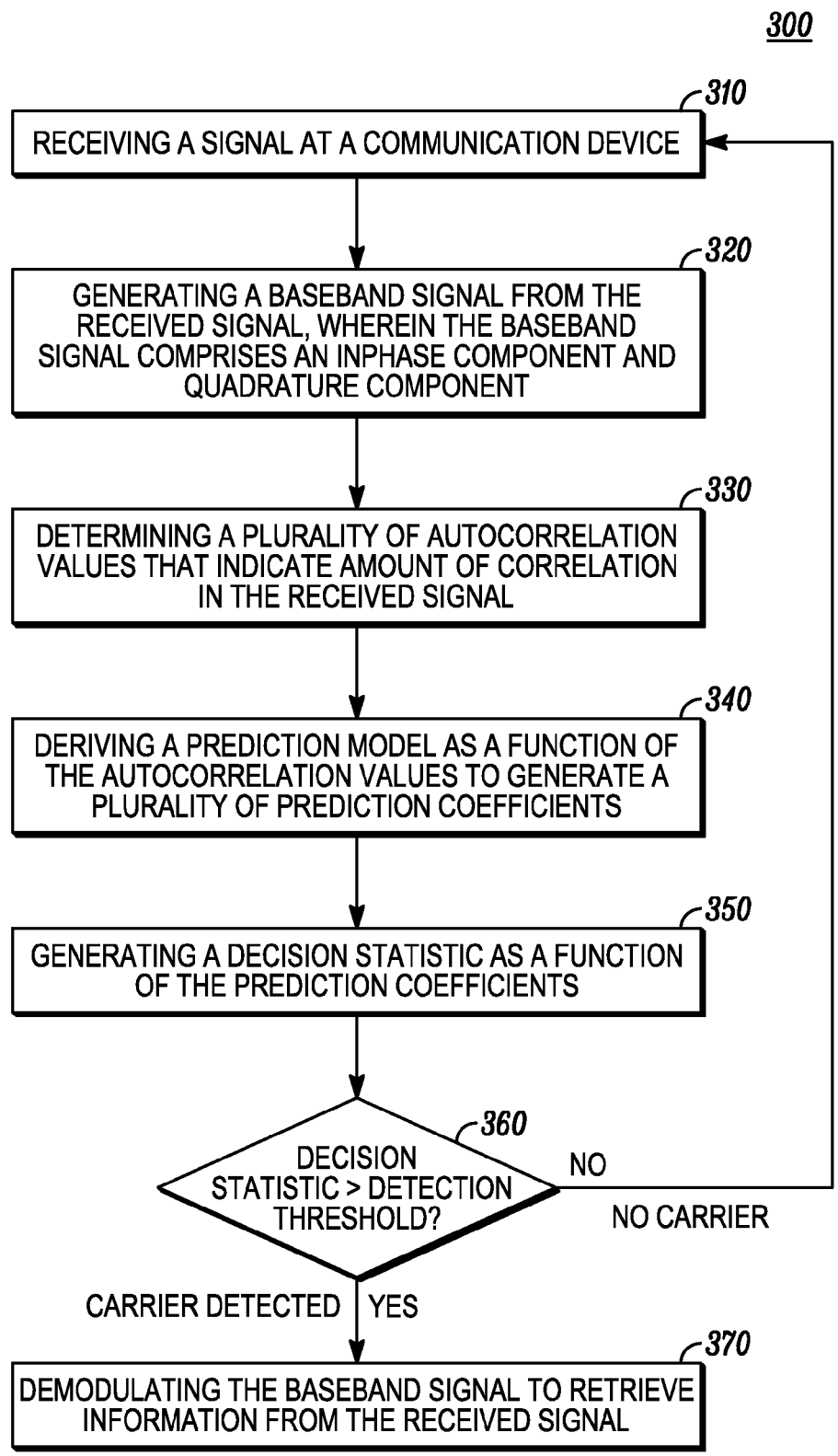
FIG. 3 is a flowchart of a method of detecting the presence of a carrier in a received signal in accordance with an embodiment.

Turning now to FIG. 3, a flow diagram illustrating a method to detect the presence of a carrier in a received signal in accordance with alternate embodiments is shown and indicated at 300. It should be realized that the method 300 illustrated by reference to FIG. 3 includes functionality that may be performed in hardware, firmware, software or a combination thereof and may further be performed at a single hardware device or a combination of hardware devices. For example, the method 300 can be implemented in the receiver 100. Also, one or more steps of the method illustrated at 300 can be performed at supporting hardware units external to the receiver 100.

In general the method 300 comprises: receiving (310) a signal at a communication device, generating (320) a baseband signal from the received signal; wherein the baseband signal comprises an inphase component and quadrature component; determining (330) a plurality of autocorrelation values which indicate an amount of correlation in the received signal; deriving (340) a prediction model as a function of the autocorrelation values to generate a plurality of prediction coefficients; generating (350) a decision statistic as a function of the prediction coefficients; comparing (360) the decision statistic with a detection threshold; and demodulating (370) the baseband signal to retrieve information from the received signal when the presence of the carrier is detected.

Illustrative details for implementing the method 300 will next be described. At 310, a communication device receives a signal from another communication device. In accordance with one embodiment, the received signal is a narrowband signal such as a FM signal. In general, FM signals are constant envelope signals that have significant correlation depth. A typical complex FM signal can be written as, $$z(t)=\exp(j(\omega_0 t+\lambda\phi(t)+\phi_0)) \qquad (1)$$

where, $\omega_0$ is the carrier frequency, $\lambda$ controls the frequency deviation, and $\phi(t)$ is the accumulated phase due to information (modulating) signal and $\phi_0$ is a random phase component. The real part or the in-phase component of z(t) is given by, $$x(t)=\cos(\omega_0 t+\lambda\phi(t)+\phi_0) \qquad (2)$$

The FM signal, being a nonlinear function of the modulating signal, is highly predictable. The autocorrelation $R_{xx}$ of the real part of the FM signal in (2) evaluated at a time lag $\tau$ is, $$R_{xx}(\tau) = \frac{1}{2}Re\{R_{zz}(\tau)\} = \frac{1}{2}Re\{E(z^*(t)z(t+\tau))\} \qquad (3)$$

where, Re{.} denotes the real part of a complex entity and E{.} represents the statistical expectation operator and z* represents the complex conjugate of z. Based on the above definitions, the autocorrelation $R_{xx}$ can be written as, $$R_{xx}(\tau) = \frac{1}{2}\exp\left[-\lambda^2 \int_0^\tau [\tau-\alpha]R_{mm}(\alpha)d\alpha\right] \qquad (4)$$

where, exp[.] denotes the exponential and $R_{mm}(\alpha)$ denotes the autocorrelation of the modulating signal (information signal).

At 320, the communication device generates a baseband signal from the received signal. In accordance with one embodiment, the communication device processes the received FM signal to generate a plurality of samples. For example, the communication device uses an A/D converter to digitalize the received FM signal and a quadrature demodulator to generate the inphase and quadrature phase signals from the digitalized signal. Using the FM signal represented by equation (1), the sampled inphase and the quadrature phase signals can be represented as $$x_i(n)=\cos(\lambda\phi(n)+\phi_0) \text{ and } x_q(n)=\sin(\lambda\phi(n)+\phi_0) \qquad (5)$$

where $x_i$ (n) is the in phase signal and $x_q$ (n) is the quadrature phase signal.

In order to formulate the detection problem, two hypotheses: $H_0$ (Null hypothesis): no FM carrier; and $H_1$: FM carrier plus noise are defined. The received signal samples under the two hypotheses are:

$$H_0: r(t)=u(t); \text{ and} \qquad (6)$$

$$H_1: r(t)=z(t)e^{-j\omega_0 t}+u(t). \qquad (7)$$

Under the two different hypotheses, $x_i(n)$ and $x_q(n)$ will be, $$H_0: x_i(n)=u(n), x_q(n)=\hat{u}_q(n); \text{ and} \qquad (8)$$

$$H_1: x_1(n)=\cos(\lambda\phi(n)+\phi_0)+\hat{u}_1(n), x_q(n)=\sin(\lambda\phi(n)+\hat{u}_q(n) \qquad (9)$$

where, $\hat{u}_i(n)$ and $\hat{u}_q(n)$ represent the noise samples. We will assume that these noise samples are independent, identically distributed (i.i.d) Gaussian random variables.

At 330, the communication device determines a plurality of autocorrelation values that indicate an amount of correlation in the received signal. Generally, the plurality of autocorrelation values can be determined by using an autocorrelation function. In accordance with an alternate embodiment, the amount of correlation in the received signal can be estimated by using simple first order recursive structures. For example, single pole Infinite Impulse Response (IIR) filters can be used to determine the plurality of autocorrelation values. At 340, the communication device derives a prediction model as a function of the plurality of autocorrelation values, which is used to generate a plurality of prediction coefficients.

In one embodiment, the prediction model is a multi step prediction model which includes an M-step predictor with $M > M_0$, where $M_0$ is a measure of the maximum correlation depth of at least one signal received when there is no carrier present (e.g., noise). In general, the prediction step M can be chosen in a way that maximizes the signal feature to noise ratio. In other words, a prediction step is chosen such that the desired signal of interest is correlated at the time lags controlled by the prediction step, whereas any undesired interference is not. In an embodiment, the prediction model may comprise a Wiener prediction model which is used to compute the prediction coefficients from the autocorrelation values. Alternatively, the prediction model comprises a Least Mean Square (LMS) algorithm to estimate the prediction coefficients using an online sample by sample approach.

The particular prediction model used depends on the autocorrelation values and the prediction order. The prediction order (or the number of coefficients in the prediction model) uniquely determines the amount of the residual error after prediction. In general, an increase in the predictor order implies estimation of more signal autocorrelations that might increase the complexity as well as convergence time of the estimators (number of samples needed to get a reliable estimate). Since the baseband FM signal is a complex exponential signal, the real and imaginary components are highly predictable, and even a simple 2-tap (i.e., first order) predictor that generates two prediction coefficients can be used to detect the presence of the carrier. The greatest advantage here is the simplicity of the predictor and the reduced convergence time.

For example, if the predictor coefficients are denoted by $w=[w_1, w_2]$, and the noisy FM signal autocorrelations for either the real or imaginary signals are denoted by $r(\tau)$, the Wiener solution is given by, $$\begin{bmatrix} r(0) & r(1) \\ r(1) & r(0) \end{bmatrix} \begin{bmatrix} w_1 \\ w_2 \end{bmatrix} = \begin{bmatrix} r(M) \\ r(M+1) \end{bmatrix} \quad (10)$$

$$[w_1, w_2] = \begin{bmatrix} \frac{r(0)r(M) - r(1)r(M+1)}{r^2(0) - r^2(1)}, \\ \frac{r(0)r(M+1) - r(1)r(M)}{r^2(0) - r^2(1)} \end{bmatrix} \quad (11)$$

However, the prediction model can be derived using alternative approaches based on the autocorrelation values.

At 350, the communication device generates a decision statistic as a function of the plurality of prediction coefficients generated by the prediction model. In one embodiment, the communication device sums (e.g., adds) the magnitude of the plurality of prediction coefficients to generate the decision statistic. For example, for a received FM signal, such as one represented by equation (1), a decision statistic can be derived directly from the autocorrelation values as $$Z = \frac{\sum_{\tau > M_0}^{\tau_{max}} |R_r(\tau)|}{|R_r(0)|} \quad (12)$$

where $R_r(\tau)$ are the estimated autocorrelation values estimated and $\tau_i > M_0$. In a different implementation, the decision statistic can be derived from the prediction coefficients (which are determined as a function of the autocorrelation values) as $$Z = \frac{1}{K} \sum_{k=1}^{K} |w_k^R| + |w_k^I| \quad (13)$$

In the above equation, K represents the number of prediction coefficients and $|w_k^R|$ represents the $k^{th}$ prediction coefficient for the real part of the complex FM signal and $|w_k^I|$ represents the $k^{th}$ prediction coefficient for the imaginary part of the complex FM signal. It should also be noted here that it is possible to have different prediction steps or prediction orders for the real and imaginary parts of the complex FM signal. In general, the decision statistic can be determined based on any suitable combination of some or all of the generated autocorrelation values and/or prediction coefficients.

At 360, the communication device compares the decision statistic to a detection threshold. For example, the communication device compares the decision statistic (Z) with a detection threshold to distinguish between hypothesis $H_0$ and $H_1$. The communication device detects a carrier ($H_1$) when the decision statistic exceeds the detection threshold. The detection threshold can be determined experimentally. For example, a histogram can be plotted to derive a decision statistic when there is only noise and a decision statistic when there is only signal with a carrier, and the threshold can be set based on an acceptable trade-off between false alarms and missed detections. In case a carrier ($H_1$) is detected, at 370 the communication device demodulates the baseband signals to retrieve the information from the received signal. However, if no carrier ($H_0$) is detected, the communication device receives another signal to detect the presence of carrier in the new received signal.

As described above in accordance with some illustrative embodiment, a communication device can efficiently detect the presence of carrier in a received signal. The improved reliability in detecting a carrier enables fast channel scans, which can lead to a reduction in audio holes. For example, in P25 systems (implementing the Project 25 (P25) suite of standards), mobile subscribers are allowed to scan other channels even when they are receiving on a current home channel. Use of the described embodiments can significantly reduce the scan time thereby reducing any audio holes that occur while the communication device is away from its current home channel. Since, the method to detect the presence of carrier in accordance with the described embodiments relies on the fact that some signals are predictable and have high correlation depth, embodiments of the invention can be used in a device operating in accordance multiple protocols including protocols supporting both FM and simulcast transmissions. Further, in accordance with one embodiment, the carrier detection algorithm can be implemented in the transceiver IC which enables the communication device to run in battery saver mode. Furthermore, a communication device processor can cause squelching (e.g., muting of audio) of the received signal when the decision statistic is less that the detection threshold, which indicates that the carrier is not present in the received signal.

Additionally, the method to detect the presence of carrier can be used in determining wireless microphones in Television (TV) white spaces. White spaces are unused frequencies in the band of frequencies that make up the TV spectrum used to communicate TV signals. The United States Federal Communications Commission (FCC) has a proposal for allowing unlicensed wireless devices to operate within the TV spectrum to send signal including wireless microphones as long as the device does not cause harmful interference to the licensed users of the TV spectrum. Wireless microphones are narrowband signals (primarily Analog/digital FM with a bandwidth of less than 250 kHz) that can use any unused portion of a TV channel which is typically 6 MHz wide. The method to detect the presence of carrier can be used to detect these low power wireless microphones. Since the method is agnostic to the frequency offset between the transmitting wireless microphone and the receiver, it is very well suited for detecting wireless microphones.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for detecting presence of a carrier in a received signal, the method comprising:
   determining a plurality of values for the received signal that indicate an amount of correlation in the received signal, wherein the received signal is a narrowband signal; and
   detecting the presence of the carrier as a function of the plurality of values.

2. The method of claim 1, wherein the values are autocorrelation values estimated based on an autocorrelation function derived for the received signal.

3. The method of claim 1 further comprising generating a baseband signal from the received signal, wherein the values are determined based on the baseband signal.

4. The method of claim 3, wherein the baseband signal comprises an inphase component and a quadrature component, wherein the values are determined based on the inphase and quadrature components.

5. The method of claim 2, wherein detecting the presence of carrier comprises:
   generating a decision statistic as a function of the autocorrelation values; and
   comparing the decision statistic to a detection threshold to detect the presence of the carrier.

6. The method of claim 5, wherein the presence of the carrier is detected when the decision statistic exceeds the detection threshold.

7. The method of claim 5, wherein generating the decision statistic comprises:
deriving a prediction model as a function of the autocorrelation values to generate a plurality of prediction coefficients; and
generating the decision statistic as a function of the prediction coefficients.

8. The method of claim 7, wherein the prediction model comprises an M-step prediction algorithm, wherein M is greater than a value ($M_o$), which is a measure of correlation depth of at least one signal received when there is no carrier.

9. The method of claim 7, wherein the received signal is a Frequency Modulated (FM) signal.

10. The method of claim 9, wherein the prediction model is a second order prediction model that generates two prediction coefficients.

11. The method of claim 1, wherein the received signal is a wireless microphone transmitted in a Television white space.

12. A method for detecting presence of a carrier in a received signal, the method comprising:
determining a plurality of values for the received signal, wherein the plurality of values comprise prediction coefficients generated using a prediction model, prior to demodulating the received signal to retrieve information in the signal, which indicate an amount of correlation in the received signal;
summing the plurality of values to generate a decision statistic; and
comparing the decision statistic to a detection threshold, wherein the presence of the carrier is detected when the decision statistic exceeds the detection threshold.

13. The method of claim 12, wherein the plurality of values comprises autocorrelation values estimated based on an autocorrelation function derived for the received signal.

14. The method of claim 13, wherein the plurality of values further comprises the prediction coefficients generated using the prediction model that is derived as a function of the autocorrelation values, wherein the magnitude of the prediction coefficients are summed to generate the decision statistic.

15. The method of claim 13, wherein the prediction model comprises a Wiener prediction model or a Least Mean Squares algorithm used to compute the prediction coefficients.

16. A device that detects presence of a carrier in a received signal, the device comprising:
a transceiver for receiving a signal and generating a baseband signal from the received signal;
a processing device for:
determining a plurality of autocorrelation values for the baseband signal using an autocorrelation function, wherein the autocorrelation values indicate an amount of correlation in the baseband signal;
deriving a prediction model as a function of the autocorrelation values to generate a plurality of prediction coefficients;
generating a decision statistic as a function of the plurality of prediction coefficients;
comparing the decision statistic to a detection threshold to detect the presence of the carrier, wherein the presence of the carrier is detected when the decision statistic exceeds the detection threshold;
demodulation circuitry for demodulating the baseband signal to retrieve information from the received signal when the presence of the carrier is detected; and
a user interface for providing the information to a user of the device.

17. The device of claim 16, wherein the processing device is further for squelching the received signal when the decision statistic is less than the detection threshold.

18. The device of claim 16 further comprising a host processor that includes the demodulation circuitry, wherein the processing device is included in the transceiver or the host processor.

19. The device of claim 17, wherein the processing device is including in the transceiver, and wherein the demodulation circuitry is in a battery saver mode when no carrier signal is detected, and wherein the processing device further for awakening the demodulation circuitry from the battery saver mode only upon detection of the carrier signal.

* * * * *

UNITED STATES PATENT AND TRADEMARK OFFICE
CERTIFICATE OF CORRECTION

| | | |
|---|---|---|
| PATENT NO. | : 8,160,528 B2 | Page 1 of 1 |
| APPLICATION NO. | : 12/257672 | |
| DATED | : April 17, 2012 | |
| INVENTOR(S) | : Thampi et al. | |

It is certified that error appears in the above-identified patent and that said Letters Patent is hereby corrected as shown below:

On the Title Page, in the Figure, insert Tag -- 100 --, above the figure.

In Fig. 1, Sheet 1 of 3, insert Tag -- 100 --, above the figure.

Signed and Sealed this
First Day of January, 2013

David J. Kappos
*Director of the United States Patent and Trademark Office*